2,862,888

METHOD OF PREPARING HALOPHOSPHATE PHOSPHORS

John F. Ross, Shaker Heights, Ohio, assignor to General Electric Company, a corporation of New York No Drawing. Application October 10, 1956
Serial No. 615,011

6 Claims. (Cl. 252—301.4)

This invention relates to luminescent materials or phosphors, and more particularly to the preparation of phosphors of the halophosphate type.

In general, halophosphates are compounds more or less analogous to the natural mineral apatites, and the phosphor may be represented ideally by the formula $3[M_3(PO_4)_2] \cdot (M'L+RL)$, where L represents a halogen or a mixture of halogens, R represents an activator metal or metals, and M and M' represent either the same or different bivalent metals or mixtures of such metals. Suitable activator metals include antimony, manganese, bismuth, tin, lead, etc. The metals M and M' include the alkaline earth metals and zinc, cadmium, etc.

In the preparation of the more common of these halophosphate phosphors, such as calcium chlor-fluorphosphate and calcium chlorphosphate, it has been the standard practice to blend a mixture of compounds according to a batch formulation and fire this blended mixture under certain conditions to produce the desired luminescent material. For the chloride-containing halophosphate phosphors, the prior art batch formulations call for the incorporation of the chloride component into the halophosphate phosphors in the form of calcium chloride. This material is extremely hygroscopic, absorbing moisture rapidly. This characteristic is undesirable in that it is difficult to blend such material with the other components of the batch formulation and, in addition, the assay or strength of the calcium chloride is difficult to control. The hygroscopic calcium chloride cakes into lumps so that it is difficult to handle and properly blend with the other ingredients of the phosphor prior to firing.

Ammonium chloride has been tried as a substitute for calcium chloride in halophosphate phosphor preparation but it is subject to similar disadvantages and drawbacks as the calcium chloride in that the ground material cakes into lumps rendering it difficult to handle and blend properly with the other phosphor ingredients. The ammonium chloride is volatile and difficult to control resulting in increased variation in the final phosphor composition.

Furthermore, it has been determined that the brightness of the halophosphate phosphors containing calcium or mixtures of calcium and other bivalent metals will increase slowly as calcium is added until approximate stoichiometric proportions of calcium in the halophosphate formula are reached. If the stoichiometric proportion of the basic constituents is exceeded by the addition of excess calcium, by as little as 0.3 to 0.5 percent, the brightness of the phosphor will fall off very rapidly. The inaccuracies inherent in the addition of calcium chloride to the phosphor batch render it highly probable that the desired amount of chlorine will not be incorporated in the phosphor. It would therefore be necessary to add excess calcium chloride in order to get sufficient chlorine in the phosphor. This of course will affect the amount of calcium present with the result that, if the calcium content gets much above stoichiometric proportions it will poison the phosphor other things being constant.

It is therefore one object of the invention to provide a substitute for calcium chloride or ammonium chloride in a halophosphate batch formula which is non-hygroscopic and will retain a free-flowing form under all conditions prior to firing the phosphor batch.

It is a further object of the invention to provide a non-volatile, chlorine-containing compound for the accurate, controlled addition of calcium and chlorine to the halophosphate phosphor.

Still another object is to provide a compound for incorporating the chloride component into the halophosphate phosphors which is completely stable and contains a fixed, readily determinable amount of chlorine.

Briefly stated, in accordance with one aspect of my invention, I have found that a calcium chlor-apatite compound prepared by firing an intimately blended mixture of calcium acid phosphate, calcium carbonate and ammonium chloride or calcium chloride at a temperature of about 800–900° C. may be substituted for calcium chloride or ammonium chloride in a halophosphate phosphor batch formulation. The chlor-apatite compound is formed with the apparent composition $$3[Ca_3(PO_4)_2]CaCl_2$$

and is a stable, non-hygroscopic white powder easily handled and blended with the other phosphor ingredients and which provides close, accurate control of both the calcium and chlorine additions.

By way of specific example of one particular embodiment of my invention, I thoroughly mix 6 moles of calcium acid phosphate ($CaHPO_4.xH_2O$) with 3 moles of calcium carbonate and 1 mole of calcium chloride. This intimately blended mixture is fired at 850° C. for one hour. The calcium chlor-apatite compound formed corresponds to the formula $3[Ca_3(PO_4)_2]CaCl_2$.

The amounts of ingredients blended to form the chlor-apatite compounds are as follows:

| | Moles | Grams  | Mole, percent | Weight, percent |
|---|---|---|---|---|
| $CaHPO_4$ | 6 | 816 | 60 | 66.4 |
| $CaCO_3$ | 3 | 300 | 30 | 24.5 |
| $CaCl_2$ | 1 | 111 | 10 | 9.1 |

The chlor-apatite compound can be formed using 6 moles of $CaHPO_4$ with 4 moles of $CaCO_3$ and 2 moles of $NH_4Cl$ as follows:

| | Moles | Grams | Mole, percent | Weight, percent (Approx.) |
|---|---|---|---|---|
| $CaHPO_4$ | 6 | 816 | 50 | 61.6 |
| $CaCO_3$ | 4 | 400 | 33⅓ | 30.3 |
| $NH_4Cl$ | 2 | 107 | 16⅔ | 8.1 |

When using $NH_4Cl$ as a substitute for $CaCl_2$ as illustrated above, it is necessary to use 4 moles of $CaCO_3$ to supply the required calcium in the final compound. The firing of the above ingredients may take place from about 800 to 900° C. for about 1 to 1½ hours depending upon the size of the batch fired. Because of the volatility of the ammonium chloride component, it is good practice to add about a 10% excess to compensate for losses and to assure that the apatite compound contains the proper proportion of chlorine. The chlor-apatite compound so formed may be substituted for calcium chloride or ammonium chloride in any halophosphate phosphor formulation which calls for those ingredients. In other words, the compound may be substituted in the formulation of any halophosphate phosphor containing calcium and chlorine. However, it will be appreciated that the formulation need not call for calcium as the principal bivalent metal in the phosphor composition. The calcium may form only a part of or be mixed with other bivalent metals in the phosphor. In the same vein, the substitution may be made in halophosphate phosphors containing halogens other than chlorine or at least not limited to chlorine alone but rather in halophosphates which combine chlorine with other halogens. The substitution of the chlor-apatite compound for calcium chloride or ammonium chloride in the halophosphate phosphor batch formulation is made on the basis of chlorine. In other words, the chlor-apatite compound is substituted so that equal parts of chlorine are added to the batch formulation to replace the chlorine called for in the calcium chloride or ammonium chloride addition. The ratio of substitution then is 1:1 of chlorine.

The chlor-apatite compound is substituted, for example, in the standard cool white, calcium chlor-fluor phosphate phosphor formulation having a chlorine to fluorine ratio of 15 to 80 as follows:

|  | Moles | Mole, percent | Weight (gms. ×15) | Percent by Wt. (Approx.) |
| --- | --- | --- | --- | --- |
| CaHPO$_4$ | 0.8404 | 59.8 | 1847 | 60.2 |
| CaCO$_3$ | 0.3669 | 26.1 | 555 | 18.1 |
| CaChlor-apatite | 0.0266 | 1.9 | 415 | 13.5 |
| CaF$_2$ | 0.1334 | 9.5 | 156 | 5.1 |
| MnCO$_3$ | 0.0266 | 1.9 | 49 | 1.6 |
| Sb$_2$O$_3$ | 0.0103 | 0.7 | 45 | 1.5 |

Intimately mixing and firing the above ingredients at 1160° C. for 1½ hours will produce the phosphor. It is well known and appreciated that the firing can take place from approximately 1100–1200° C. for about 1 to 2 hours depending upon the size of the batch fired. The calcium acid phosphate used in the preparation of the chlor-apatite compound as well as in the phosphor formulation ranges from about 90 to about 94 percent anhydrous. The activator metals in the preferred example may range from 0.75 to 3 percent by weight antimony and 0 to 2.4 percent by weight manganese.

It will be appreciated that the foregoing halophosphate phosphor batch formulation is set forth by way of example and not by way of limitation since the method of halophosphate phosphor preparation of my invention is applicable to all halophosphate phosphors whose batch formulation calls for the addition of a chloride containing component and which calls for calcium as one of the bivalent metals of the phosphor or for mixtures of calcium and other suitable bivalent metals.

It is well known that various metals and mixtures of metals other than calcium may be substituted completely or in part for calcium in the preparation of halophosphate phosphors. U. S. Patent No. 2,592,261—Fonda, assigned to the assignee of the present invention, discloses such metal substituents as calcium, cadmium, strontium, magnesium and zinc.

Various metal activators are also well known to be effective with halophosphate phosphors. For example, reference may be had to U. S. Patent No. 2,488,733—McKeag et al., also assigned to the assignee of the present invention, which lists such activators as antimony, bismuth, tin, lead and manganese. It is also well known that the halogen in halophosphate phosphors is preferably fluorine or chlorine or mixtures thereof, and may include bromine or iodine, at least in part.

Although a preferred embodiment of my invention has been disclosed, it is recognized that variations and changes may be made therein within the spirit and scope of the invention as defined by the appended claims. It is understood further that the formulation and proportions of ingredients may be varied and also that the firing time and temperatures may be varied independently and in relation to each other within fairly wide limits to obtain the desired results. Further, it will be particularly recognized that my invention is not limited with respect to the particular phosphor composition employed, good results being obtained with all calcium and chlorine-containing halophosphate phosphors.

What I claim as new and desire to secure by Letters Patent of the United States is:

1. The method of preparing a halophosphate phosphor which comprises preliminarily preparing at a temperature of about 800–900° C. calcium chlor-apatite, substituting said calcium chlor-apatite in a ratio of about 1:1 of chlorine for the chloride ingredient in a halophosphate phosphor batch formula, blending together said calcium chlor-apatite and the ingredients of said formula and firing at a temperature and for a time sufficient to form the phosphor.

2. The method of preparing an activated halophosphate phosphor which comprises preliminarily preparing at a temperature of about 800–900° C. calcium chlor-apatite, substituting said calcium chlor-apatite in a ratio of about 1:1 of chlorine for the chloride ingredient in a halophosphate batch formula, blending said formulation with compounds of activator metals in activating proportions and firing said blend at about 1100–1200° C. for about 1 to 2 hours.

3. The method of preparing an activated halophosphate phosphor which comprises preliminarily firing at a temperature of about 800–900 C. an intimate admixture of about 50 to about 60 mole percent calcium acid phosphate about 30 to about 33 mole percent calcium carbonate and about 10 to about 17 mole percent of a material selected from the group consisting of calcium chloride and ammonium chloride to form a calcium chlor-apatite compound, substituting said calcium chlor-apatite in a ratio of about 1:1 of chlorine for the chloride ingredient in a halophosphate batch formula, blending said formulation and firing the blend at about 1100–1200° C. for about 1 to 2 hours.

4. The method of preparing an activated calcium chlor-fluor phosphate phosphor which comprises preliminarily firing at a temperature of about 800–900° C. an intimate admixture of about 50 to about 60 mole percent calcium acid phosphate about 30 to about 33 mole percent calcium carbonate and about 10 to about 17 mole percent of a material selected from the group consisting of calcium chloride and ammonium chloride to form a calcium chlor-apatite compound, intimately admixing about 2 mole percent of said compound with about 60 mole percent calcium acid phosphate about 26 mole percent calcium carbonate and about 9½ mole percent calcium fluoride and the balance of suitable activator compounds in activating proportions, firing said admixture at about 1100–1200° C. for about 1 to 2 hours.

5. The method of preparing an activated calcium chlor-fluor phosphate phosphor which comprises preliminarily firing at a temperature of about 800–900° C. an intimate admixture of about 50 to about 60 mole percent calcium acid phosphate about 30 to about 33 mole percent calcium carbonate and about 10 to about 17 mole percent of a material selected from the group consisting of calcium chloride and ammonium chloride to form a calcium chlor-apatite compound, intimately admixing about 2 mole percent of said compound with about 60 mole percent calcium acid phosphate about 26 mole percent calcium carbonate about 9.5 mole percent calcium fluoride about 2 mole percent manganese carbonate and about 0.7 mole percent antimony trioxide, firing said admixture at about 1100–1200° C. for about 1 to 2 hours.

6. The method of preparing an activated calcium chlor-fluor-phosphate phosphor, said method comprising intimately mixing about 2 mole percent of calcium chlor-apatite, about 60 mole percent calcium acid phosphate, about 26 mole percent calcium carbonate, about 9.5 mole percent calcium fluoride, about 2 mole percent manganese carbonate and about 0.7 mole percent antimony trioxide, and firing said admixture at a temperature for a time sufficient to form the phosphor.

References Cited in the file of this patent

UNITED STATES PATENTS

| | | |
|---|---|---|
| 2,476,654 | Froelich | July 19, 1949 |
| 2,488,733 | Froelich | Nov. 22, 1949 |
| 2,579,900 | Butler | Dec. 25, 1951 |

OTHER REFERENCES

Wanamaker: Philips Research Reports, October 1955, vol. 10, pages 11–38.